Oct. 1, 1957  M. D. BOGGESS  2,808,155
COMBINATION FLOOR AND SPRING JACK
Filed Nov. 29, 1954  2 Sheets-Sheet 1
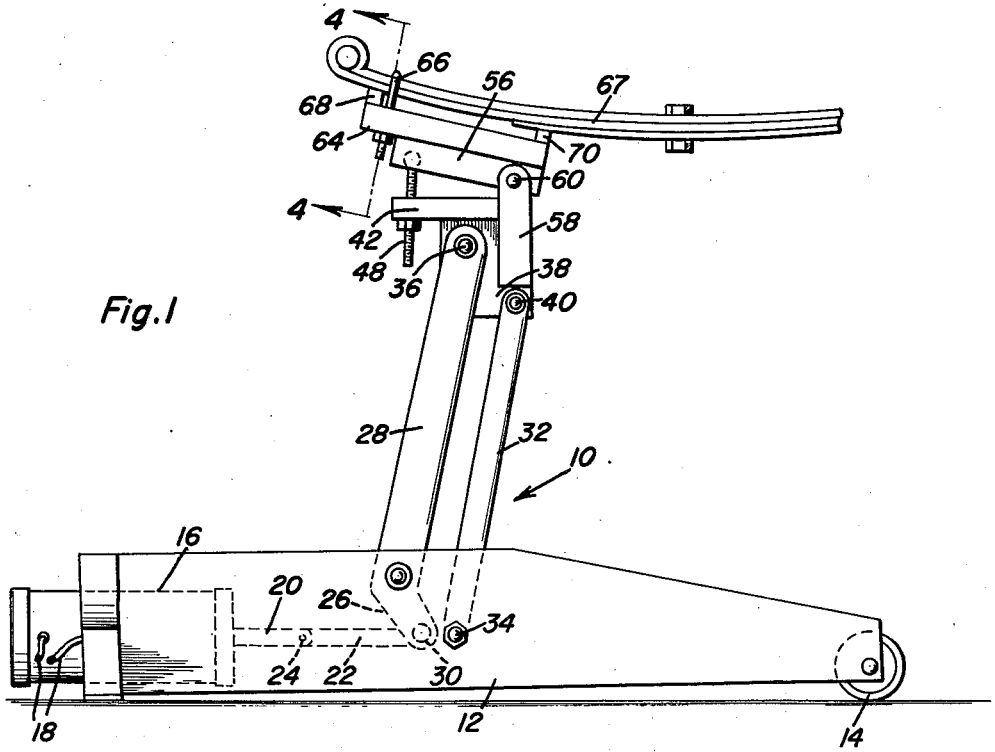
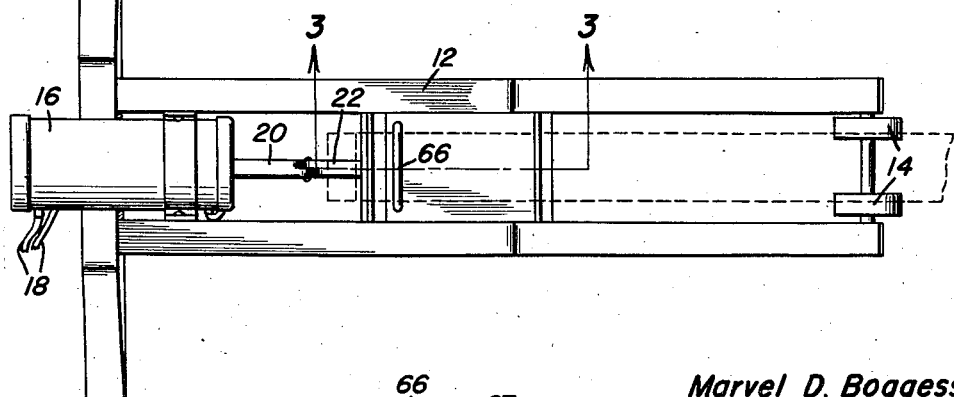
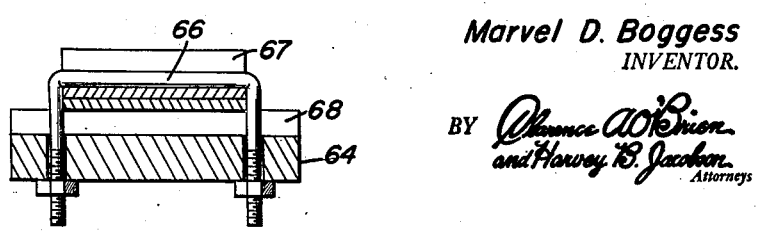
Marvel D. Boggess
INVENTOR.

Oct. 1, 1957 M. D. BOGGESS 2,808,155
COMBINATION FLOOR AND SPRING JACK
Filed Nov. 29, 1954 2 Sheets-Sheet 2

Marvel D. Boggess
INVENTOR.

United States Patent Office 2,808,155
Patented Oct. 1, 1957

2,808,155

COMBINATION FLOOR AND SPRING JACK

Marvel D. Boggess, Nitro, W. Va.

Application November 29, 1954, Serial No. 471,647

3 Claims. (Cl. 214—1)

This invention relates to a combination floor and spring jack which has great flexibility of use so as to be adapted to be utilized in the removal and replacement of vehicle springs and for such other lifting functions as are normally found necessary in the maintenance and repair of vehicles.

The consrtuction of this invention features the utilization of a wheeled chassis having a head mounted for movement in a level plane which carries an angularly adjustable saddle so as to enable springs or like elements of vehicles to be held in an adjusted position.

Still further objects and features of this invention reside in the provision of a combination floor and spring jack that is strong and durable, simple in construction and manufacture, which is capable of using conventional hydraulic equipment for the actuation thereof, and which is relatively inexpensive to construct, thereby permitting wide distribution and utilization.

These, together with the various ancillary objects and features of the invention which will become apparent as the following description proceeds, are attained by this combination floor and spring jack, preferred embodiments of which have been shown in the accompanying drawings, by way of example only, wherein:

Figure 1 is a side elevational view of the jack comprising the present invention shown in use replacing an over-axle spring;

Figure 2 is a top plan view of the jack;

Figure 4 is an enlarged sectional detail view as taken along the plane of line 4—4 in Figure 1;

Figure 3:
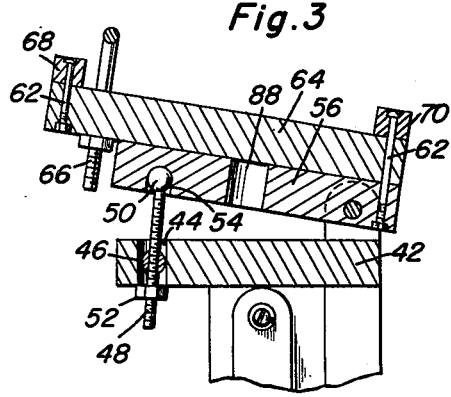
Figure 3 is an enlarged vertical sectional view as taken along the plane of line 3—3 in Figure 2.

With continuing reference to the accompanying drawings wherein like reference numerals designate similar parts throughout the various views, reference numeral 10 is used to generally designate the combination jack comprising the present invention. This combination jack includes a chassis 12 provided with casters as at 14 which are mounted inwardly of the chassis 12 to thereby enable the jack to be placed more closely adjacent the wheels of a vehicle and thus provide adequate room for maneuvering when performing operations on the springs or other portions of the vehicle normally positioned against the wheels of the vehicle.

Within the chassis 12 there is mounted a conventional hydraulic cylinder 16 which is connected by suitable conduits 18 to a pressure pump, not shown, and which has a piston rod 20 pivotally connected to a connecting link 22, as at 24, the connecting link 22, in turn, being pivotally attached to the limb 26 of a boom 28, as at 30.

A head leveling rod 32 is also provided and is pivotally attached, as at 34, to the chassis 12. The boom 28 is pivotally attached, as at 36, to the head 38 which also has the leveling arm 32 pivotally attached, at as 40.

The head 38 includes a platform 42 which is provided with a hole 44 therethrough with a shaft 46 rotatably mounted in the platform 42 and extending through the hole 44 transversely thereto. The shaft 46 is internally threaded for reception of a threaded adjusting member 48 having a spherical head 50. A nut 52 is threadedly engaged on the threaded adjusting member 48 below the platform 42, and the head 50 of the adjusting member 48 is received in a socket 54 in a saddle 56.

Secured to the head 38 are a pair of ears 58 through which a pin 60 extends, the pin also extending through the saddle 56 to form a hinge mount for the saddle 56. The threaded adjusting member 48 provides means for angularly adjusting the saddle 56 relative to the head 38.

As can be best seen in Figure 3, there is secured by means of fasteners, such as bolts 62, to the saddle 56 a plate serving as a saddle extension 64 about which a U-bolt 66 is adapted to be secured. The U-bolt is provided for engaging the leaves of a over-axle spring, as indicated at 67, so as to hold the over-axle spring 67 in proper position and on blocks 68 and 70 held by the fasteners 62 to the saddle 56 and saddle extension 64. Because of the parallelogram linkage formed by the boom 28, the chassis 12, the leveling rod 32, and the head 38, the head can be moved upwardly while being held level or at a constant selected angular inclination.

Figure 5:
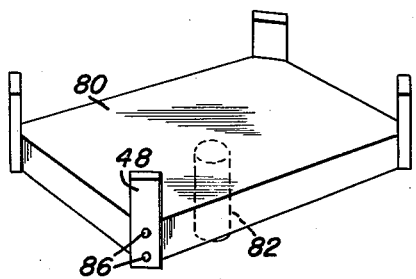
Figure 5 is a perspective view of the plate adapted to be associated with the saddle when the jack is utilized for conventional lifting purposes.
Figure 6:
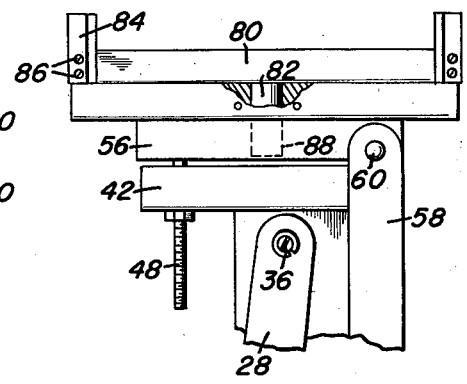
Figure 6 is a side elevational view of a portion of the jack including the head and saddle showing the plate installed with parts of the saddle being broken away for detail.

In Figure 5, there is shown an attachment for the saddle 56 which includes a plate 80 having a downwardly depending preferably circular stud 82 attached thereto. The corners of the plate are beveled and upwardly extending fingers 84 are affixed by fasteners 86 to the plate 80. With the plate 80 and the stud 82 positioned on and resting in the opening 88 in the saddle 56, the jack is ready to be utilized for various lifting purposes, as may be desired.

Figure 7:
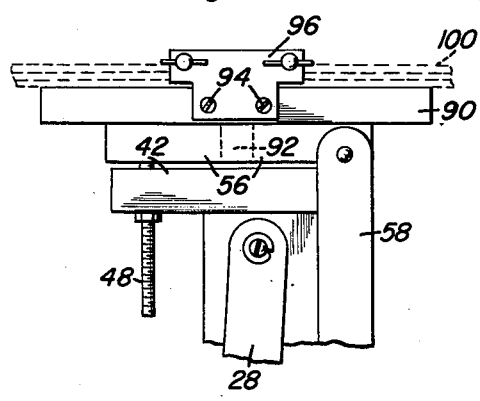
Figure 7 is an elevational view showing the invention as utilized for positioning an underslung spring.
Figure 8:
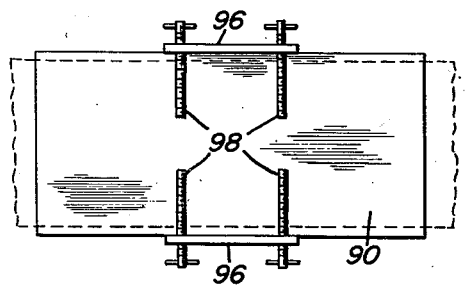
Figure 8 is a plan view of the construction shown in Figure 7.

Referring now to Figures 7 and 8, it will be noted that the saddle 56 may have affixed thereto a plate 90 and have a stud 92 depending from the plate 90 extending into the opening 88. Fixed to the plate 90 by means of screws 94 or like fasteners are a pair of substantially T-shaped brackets 96 in which threaded fasteners 98 are engaged. The threaded fasteners 98 are adapted to engage the springs, as indicated in phantom lines in Figure 7, and designated by reference numeral 100, such as underslung springs of vehicles so as to hold the springs in a selected angular position so that the springs may be readily lifted into place.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A jack comprising a wheeled chassis, a parallelogram linkage including a head having a boom and a leveling rod pivotally attached thereto, said boom and said leveling rod being pivotally mounted on said chassis, means pivotally attached to said boom for pivoting said boom about an axis formed by the pivotal connection of said boom and said chassis, a saddle hingedly secured to said head, said head having a vertically extending hole therethrough, a horizontally extending shaft having a threaded aperture therethrough, said shaft being rotatably disposed in said head, said shaft extending through said hole, and a threaded adjusting member swivelly engaging said saddle threadedly adjustably engaged in said shaft for angularly adjusting said saddle relative to said head, said adjusting member extending through said hole.

2. A jack comprising a wheeled chassis, a parallelogram linkage including a head having a boom and a leveling rod pivotally attached thereto, said boom and said leveling rod being pivotally mounted on said chassis, means pivotally attached to said boom for pivoting said boom about an axis formed by the pivotal connection of said boom and said chassis, a saddle hingedly secured to said head, said head having a vertically extending hole therethrough, a horizontally extending shaft having a threaded aperture therethrough, said shaft being rotatably disposed in said head, said shaft extending through said hole, and a threaded adjusting member swivelly engaging said saddle threadedly adjustably engaged in said shaft for angularly adjusting said saddle relative to said head, said adjusting member extending through said hole, and a U-bolt removably attached to said saddle for holding a spring.

3. A jack comprising a wheeled chassis, a parallelogram linkage including a head having a boom and a leveling rod pivotally attached thereto, said boom and said leveling rod being pivotally mounted on said chassis, means pivotally attached to said boom for pivoting said boom about an axis formed by the pivotal connection of said boom and said chassis, a saddle hingedly secured to said head, said head having a vertically extending hole therethrough, a horizontally extending shaft having a threaded aperture therethrough, said shaft being rotatably disposed in said head, said shaft extending through said hole, and a threaded adjusting member swivelly engaging said saddle threadedly adjustably engaged in said shaft for angularly adjusting said saddle relative to said head, said adjusting member extending through said hole, plates attached to opposed sides of said saddle, and threaded fasteners adjustably extending through said plates for engaging a spring.

References Cited in the file of this patent

UNITED STATES PATENTS

| | | |
|---|---|---|
| 1,885,809 | Ellis | Nov. 1, 1932 |
| 2,479,679 | Grime | Aug. 23, 1949 |
| 2,523,734 | Stephenson et al. | Sept. 26, 1950 |
| 2,583,114 | Monteith | Jan. 22, 1952 |